(12) United States Patent (10) Patent No.: US 12,646,182 B2
Yoshimura et al. (45) Date of Patent: Jun. 2, 2026

(54) FULL-BODY TRACKING SYSTEM

(71) Applicant: TOYOTA JIDOSHA KABUSHIKI KAISHA, Aichi-ken (JP)

(72) Inventors: Naoya Yoshimura, Sumida-ku (JP); Hitoshi Kamada, Setagaya-ku (JP); Norimasa Kobori, Nakano-ku (JP); Hsuan-Kung Yang, Setagaya-ku (JP); Tsu-Ching Hsiao, Taito-ku (JP); Daniel Nemcik, Nakano-ku (JP); Ashutosh Kumar, Chuo-ku (JP); Betty Magali Claire Le Dem, Chuo-ku (JP); Ryuya Nishino, Toshima-ku (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 19/188,006

(22) Filed: Apr. 24, 2025

(65) Prior Publication Data

US 2025/0356501 A1 Nov. 20, 2025

(30) Foreign Application Priority Data

May 17, 2024 (JP) ................................. 2024-081075

(51) Int. Cl.
*G06T 7/20* (2017.01)
*G06F 3/01* (2006.01)
(Continued)

(52) U.S. Cl.
CPC ................ *G06T 7/20* (2013.01); *G06F 3/011* (2013.01); *G06T 7/70* (2017.01); *G06V 40/23* (2022.01);
(Continued)

(58) Field of Classification Search
CPC . G06F 3/011; G06T 7/20; G06T 7/292; G06T 7/70; G06T 2207/10016;
(Continued)

(56) References Cited

U.S. PATENT DOCUMENTS 9,697,417 B2 * 7/2017 Aonuma ................ G06V 40/23
9,981,193 B2 * 5/2018 Adams .................. A63F 13/213
(Continued)

FOREIGN PATENT DOCUMENTS

JP H10-302070 A 11/1998
JP 2023-057498 A 4/2023
(Continued)

*Primary Examiner* — Vinh T Lam
(74) *Attorney, Agent, or Firm* — HAUPTMAN HAM, LLP

(57) ABSTRACT

According to an embodiment of the present disclosure, the processing circuitry of the full-body tracking system communicates with various cameras located in the tracking space to acquire image data captured by the cameras. For the acquisition of the image data, a camera that has already been introduced into the tracking space for another purpose. The processing circuitry performs tracking and skeleton estimation for each user in the tracking space using the acquired image data. The processing circuitry authenticates a target user on which full body tracking is performed, and acquires position information and skeleton information of the authenticated target user from the result of the tracking and the skeleton estimation. Then, the processing circuitry reflects the body motion of the target user on the virtual avatar in the XR space using the acquired position information and skeleton information of the target user.

10 Claims, 4 Drawing Sheets

(51) Int. Cl.
 *G06T 7/70*    (2017.01)
 *G06V 40/20*   (2022.01)
(52) U.S. Cl.
 CPC ............... *G06T 2207/10016* (2013.01); *G06T 2207/30196* (2013.01); *G06T 2207/30232* (2013.01)
(58) Field of Classification Search
 CPC G06T 2207/30196; G06T 2207/30232; G06V 40/103; G06V 40/23
 See application file for complete search history.

(56)     References Cited

U.S. PATENT DOCUMENTS

| | | | | |
|---|---|---|---|---|
| 10,004,462 | B2 * | 6/2018 | Ernst | A61B 5/721 |
| 10,083,376 | B2 * | 9/2018 | Kolavennu | G08B 13/19604 |
| 11,113,887 | B2 * | 9/2021 | Kopeinigg | G06Q 10/40 |
| 11,210,557 | B2 * | 12/2021 | Sato | G06F 18/2148 |
| 11,507,203 | B1 * | 11/2022 | Bosworth | G06F 3/011 |
| 11,568,617 | B2 * | 1/2023 | Sung | G06T 19/006 |
| 11,682,172 | B2 * | 6/2023 | Cossairt | A63F 13/213 |
| | | | | 463/31 |
| 11,783,494 | B2 * | 10/2023 | Li | G06V 10/82 |
| | | | | 382/103 |
| 12,020,359 | B2 * | 6/2024 | Gelencser | G06T 13/40 |
| 12,073,570 | B2 * | 8/2024 | Shimizu | G06T 13/40 |
| 12,148,102 | B2 * | 11/2024 | Palacios | G06T 7/50 |
| 12,159,338 | B1 * | 12/2024 | Chen | G06F 3/011 |
| 12,169,890 | B2 * | 12/2024 | Assouline | G06T 7/251 |
| 12,229,860 | B2 * | 2/2025 | Assouline | H04L 67/131 |
| 12,417,654 | B2 * | 9/2025 | Qiu | G06T 7/73 |
| 12,429,959 | B2 * | 9/2025 | Yamauchi | G06F 3/011 |
| 12,462,611 | B2 * | 11/2025 | Hasegawa | G06V 40/23 |
| 2009/0213114 | A1 * | 8/2009 | Dobbins | G06F 3/011 |
| | | | | 345/419 |
| 2009/0267948 | A1 * | 10/2009 | Finn | G06T 15/10 |
| | | | | 345/473 |
| 2014/0347479 | A1 * | 11/2014 | Givon | G06V 40/103 |
| | | | | 382/116 |
| 2015/0078621 | A1 * | 3/2015 | Choi | G06F 3/017 |
| | | | | 382/103 |
| 2016/0350973 | A1 * | 12/2016 | Shapira | G06F 3/011 |
| 2018/0143637 | A1 * | 5/2018 | Tian | G05D 1/0094 |
| 2018/0225517 | A1 * | 8/2018 | Holzer | G06T 7/73 |
| 2018/0342071 | A1 * | 11/2018 | Shibata | G06F 18/2411 |
| 2020/0097732 | A1 * | 3/2020 | Doolittle | G06V 40/23 |
| 2020/0202538 | A1 * | 6/2020 | Hsu | G06T 7/50 |
| 2021/0081031 | A1 * | 3/2021 | Perlin | G06F 3/04817 |
| 2021/0407266 | A1 * | 12/2021 | Jarvis | G06N 3/02 |
| 2022/0114751 | A1 * | 4/2022 | Kannan | G06T 11/60 |
| 2022/0237874 | A1 * | 7/2022 | Sherk | G06F 3/014 |
| 2022/0374070 | A1 * | 11/2022 | Perlin | G06F 3/0484 |
| 2023/0185386 | A1 * | 6/2023 | Bosworth | G06F 3/011 |
| | | | | 345/156 |
| 2023/0186741 | A1 | 6/2023 | Kobori | |
| 2024/0077938 | A1 * | 3/2024 | Ishii | G06T 13/80 |
| 2024/0359081 | A1 * | 10/2024 | Yamagishi | G06T 7/55 |
| 2025/0182390 | A1 * | 6/2025 | Kips | G06T 19/006 |

FOREIGN PATENT DOCUMENTS

| | | |
|---|---|---|
| JP | 2023-086471 A | 6/2023 |
| JP | 2024-030610 A | 3/2024 |

* cited by examiner

FULL-BODY TRACKING SYSTEM

CROSS-REFERENCE TO RELATED APPLICATION

The present application claims priority under 35 U.S.C. § 119 to Japanese Patent Application No. 2024-081075, filed on May 17, 2024, the contents of which application are incorporated herein by reference in their entirety.

FIELD

The present disclosure relates to a full-body tracking system that acquires a user's body motion in three dimensions in order to reflect the user's body motion on a virtual avatar in an XR application including VR, AR, and MR.

BACKGROUND

JP2023-057498A discloses a motion capture system for acquiring information on a physical posture in motion of a user who is a subject. In this motion capture system, a general camera (for example, a digital camera, a smartphone, or a tablet) captures an image of the physical posture in motion of the subject. The captured image, a virtual camera having the same viewing angle as the capturing camera, and a three dimensional character imitating the subject are arranged in a three dimensional space, and the angle and position coordinates of each bone when the subject image viewed from the virtual camera and the posture of the character coincide with each other are acquired over a plurality of frames, thereby three dimensionally capturing the movement of the physical posture in motion of the subject.

A conventional full-body tracking system requires the user to wear a device, install the device in a tracking space, and introduce some kind of device for full-body tracking into a tracking space. Even when using a typical camera such as a smartphone as in the technique disclosed in JP2023-057498A, the camera needs to be installed so as to be able to capture the entire body of the user.

As described above, in the conventional full-body tracking system, the tracking space in which the full-body tracking can be performed is limited. In addition, in order to expand the tracking space, it is necessary to additionally introduce a device for full-body tracking.

Examples of documents showing the technical level of the technical field related to the present disclosure include JP2024-030610A, JP 1998-302070A, and JP2023-086471A, in addition to JP2023-057498A.

SUMMARY

The present disclosure has been made in view of the above problems. An object of the present disclosure is to provide a full-body tracking system capable of easily expanding a tracking space.

According to an embodiment of the present disclosure, the processing circuitry of the full-body tracking system communicates with various cameras located in the tracking space to acquire image data captured by the cameras. For the acquisition of the image data, a camera that has already been introduced into the tracking space for another purpose, for example, a surveillance camera installed in the tracking space, a camera mounted on a moving object that moves in the tracking space, a camera mounted on a mobile terminal carried by the user, or the like is used. The processing circuitry performs tracking and skeleton estimation for each user in the tracking space using the acquired image data. The processing circuitry authenticates a target user on which full-body tracking is performed, and acquires position information and skeleton information of the authenticated target user from the result of the tracking and the skeleton estimation. Then, the processing circuitry reflects the body motion of the target user on the virtual avatar in the XR space using the acquired position information and skeleton information of the target user.

According to the full-body tracking system configured as described above, as long as a camera capable of communication exists in a space, the space can be set as a tracking space. That is, the tracking space can be expanded without requiring an additional device for full-body tracking. Further, since the image data acquired from the camera located in the tracking space is used, the user does not have to prepare a device for full-body tracking. The user can use an application using full-body tracking in a device that does not have a function of full-body tracking, for example, a smartphone, a head mounted display, or the like. Further, the user can perform full-body tracking only by entering the tracking space.

DETAILED DESCRIPTION

1. Overview of Full-Body Tracking System

In the XR application including VR, AR, and MR, the body motion of the user is reflected in a virtual avatar in the XR space. The full-body tracking system described below is a system that acquires three dimensional data indicating the motion of the body of a user and outputs avatar generation information for generating an avatar of each user based on the acquired three dimensional data.

Figure 1:
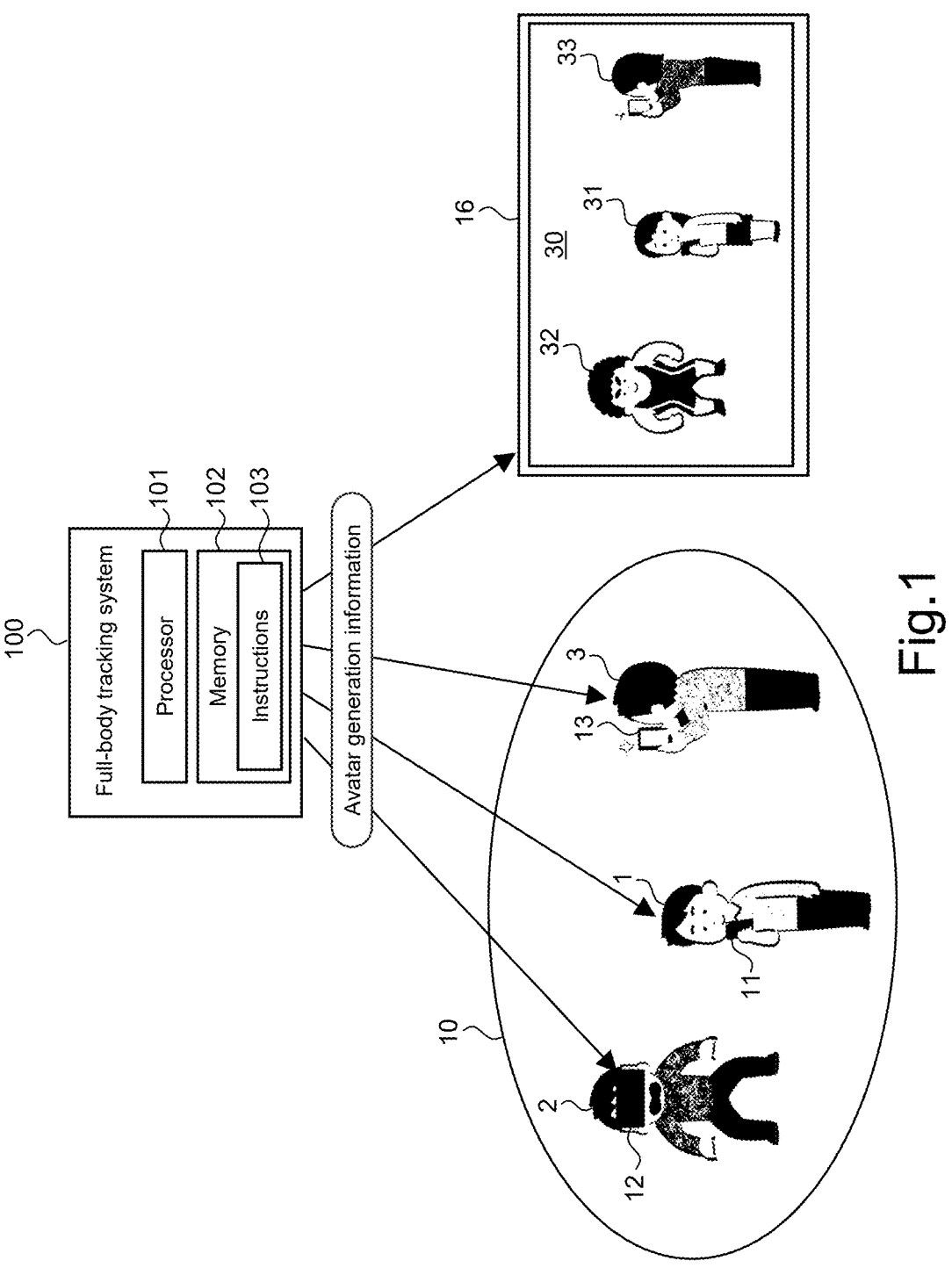
FIG. 1 is a diagram illustrating an overview of a full-body tracking system according to an embodiment of the present disclosure.

FIG. 1 is a diagram illustrating an overview of a full-body tracking system 100. The full-body tracking system 100 is a computer or group of computers that includes a processor 101 as processing circuitry and a memory 102 coupled to the processor 101. The memory 102 stores a program including a plurality of instructions 103. The processor 101 executes the instructions 103, and thereby various processes related to the full-body tracking are executed by the processor 101.

In the full-body tracking system 100, a tracking space 10 is set. The tracking space 10 is a space in which full-body tracking of a person is performed, and is also a space in which conversion to a XR space 30 is performed. In the example shown in FIG. 1, three users 1, 2, 3 are in the tracking space 10. In the XR space 30 corresponding to the tracking space 10, avatars 31, 32, and 33 corresponding to the users 1, 2, and 3, respectively, exist. The full-body tracking system 100 reflects the body motions of the users 1, 2, and 3 in the tracking space 10 on the corresponding avatars 31, 32, and 33.

The XR space 30 is displayed on a head mounted display 12 worn by the user 2 or mobile terminals 11 and 13 carried by the users 1 and 3. The XR space 30 can also be displayed on the monitor 16 which is viewed by a person other than the users 1, 2, and 3. The head mounted display 12 includes XR goggles, XR glasses, and the like. The mobile terminals 11 and 13 include a smartphone, a tablet PC, and the like. The monitor 16 includes a public viewing monitor installed in a town, a PC monitor installed in a home, a mobile terminal of a person other than the users 1, 2, and 3, and the like. The monitor 16 may be a monitor installed outside the tracking space 10. These devices 11, 12, 13, and 16 display the XR space 30 using the XR application based on the avatar generation information transmitted from the full-body tracking system 100. The XR application may be downloaded from the full-body tracking system 100.

The head mounted display 12 displays a subjective image of the XR space 30 as viewed from the avatar 32 corresponding to the user 2. In the mobile terminals 11 and 13, the users 1 and 3 can arbitrarily change the viewpoint for displaying the video of the XR space 30. For example, a subjective image when viewing the XR space 30 from the avatars 31 and 33 can be displayed on the mobile terminals 11 and 13, and an objective image including the avatars 31 and 33 can be displayed on the mobile terminals 11 and 13. The monitor 16 displays an objective image of the XR space 30 as viewed from a fixed or moving observation point.

In order to generate the avatars 31, 32, and 33 to be displayed in the XR space 30, it is necessary to grasp the positions and postures of the users 1, 2, and 3 in the tracking space 10. For the recognition of the position and posture of the user, a plurality of cameras which have been already introduced into the tracking space 10 for other purposes and which can perform real-time communication with the full-body tracking system 100 are used. The tracking space 10 may be defined as a space in which the positions and postures of the users 1, 2, and 3 can be grasped by a plurality of cameras.

2. Full-Body Tracking Mechanism

Next, a mechanism of the full-body tracking by the full-body tracking system 100, specifically, a mechanism for reflecting the position and posture of the user grasped by the plurality of cameras on the avatar will be described with reference to FIGS. 2 and 3. Note that, here, the description will be given by assuming that the user 1 among the users 1, 2, and 3 in the tracking space 10 is a target of the full-body tracking.

Figure 2:
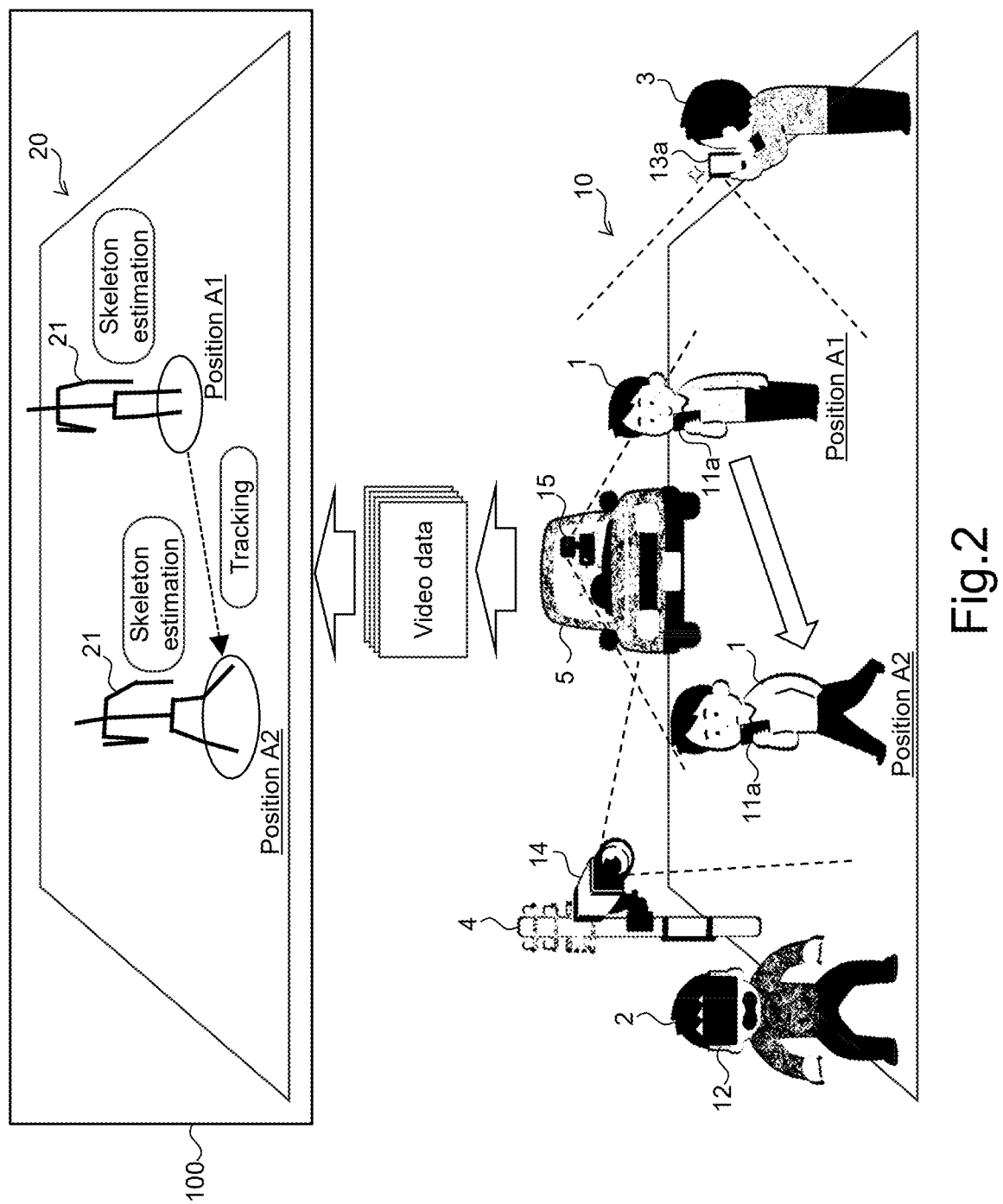
FIG. 2 is a diagram illustrating a mechanism of the full-body tracking according to the embodiment of the present disclosure.

In the example shown in FIG. 2, four cameras are introduced into the tracking space 10. The first camera is a surveillance camera 14 installed on the utility pole 4. The surveillance camera 14 is installed for the purpose of crime prevention. When the surveillance camera 14 is used for full-body tracking of the user 1, the surveillance camera 14 communicates with the full-body tracking system 100 in real time and transmits image data to the full-body tracking system 100. The surveillance camera connected to the full-body tracking system 100 may be a surveillance camera installed in a building or a private house.

The second camera is an in-vehicle camera 15 mounted on the vehicle 5. The in-vehicle camera 15 is provided for the purpose of recording the surroundings of the vehicle 5. When the in-vehicle camera 15 is used for full-body tracking of the user 1, the in-vehicle camera 15 communicates with the full-body tracking system 100 in real time and transmits image data to the full-body tracking system 100. In addition to the in-vehicle camera 15, a camera mounted on a moving object such as a patrol robot or a drone that moves in the tracking space 10 may be connected to the full-body tracking system 100.

The third camera is a camera (mobile terminal camera) 11a of the mobile terminal 11 carried by the user 1. When the mobile terminal 11 is used for full-body tracking of the user 1, an in-camera mounted inside the mobile terminal 11 functions as the mobile terminal camera 11a. The mobile terminal 11 communicates with the full-body tracking system 100 in real time, and transmits the image captured by the mobile terminal camera 11a to the full-body tracking system 100. The connection between the mobile terminal 11 and the full-body tracking system 100 may be performed only during the operation of the XR application, or may be automatically performed when the mobile terminal 11 enters the tracking space 10.

The fourth camera is a camera (mobile terminal camera) 13a of the mobile terminal 13 carried by the user 3. When the mobile terminal 13 is used for full-body tracking of the user 1, the out-camera mounted on the rear surface side of the mobile terminal 11 functions as the mobile terminal camera 13a. The mobile terminal 13 communicates with the full-body tracking system 100 in real time, and transmits the image captured by the mobile terminal camera 13a to the full-body tracking system 100. The connection between the mobile terminal 13 and the full-body tracking system 100 may be performed only during the operation of the XR application, or may be automatically performed when the mobile terminal 13 enters the tracking space 10.

The full-body tracking system 100 acquires images from the cameras 11a, 13a, 14, and 15, and obtains the position A1 of the user 1 in the tracking space 10 from the images. When the camera that has captured the user 1 is the surveillance camera 14, the installation position of the camera is fixed, and thus, if the calibration of the position and the posture has been performed, the position A1 of the user 1 in the tracking space 10 can be calculated from the position of the user 1 in the image. The in-vehicle camera 15 and the mobile terminal cameras 11a and 13a move together with the vehicle 5 and the users 1 and 3, and the positions and postures thereof can be estimated by Simultaneous Localization and Mapping (SLAM). The positions and postures of the in-vehicle camera 15 and the mobile terminal cameras 11a and 13a can also be estimated by GPSs mounted on the vehicle 5 and the mobile terminals 11 and 13. When the camera that has captured the user 1 is the in-vehicle camera 15 or the mobile terminal camera 13a of another user, the position A1 of the user 1 in the tracking space 10 can be calculated from the position of the user 1 in the image. When the camera that has captured the user 1 is the mobile terminal camera 11a of the user 1, the position of the mobile terminal camera 11a can be regarded as the position A1 of the user 1 in the tracking space 10. When the user 1 is captured by a plurality of cameras, the position A1 of the user 1 in the tracking space 10 may be calculated based on the camera with the highest reliability, or the position A1 of the user 1 may be statistically calculated by averaging the positions of the user 1 calculated for the respective cameras.

The full-body tracking system 100 has a three dimensional coordinate system 20 corresponding to the tracking space 10, and projects the position A1 of the user 1 onto the three dimensional coordinate system 20. Then, the body motion of the user 1 at the position A1 is grasped. Specifically, skeleton estimation is performed for each image in which the user 1 appears. The skeleton estimation means estimating a joint posture of a human body having a skeleton constituted by a plurality of joints. For example, a two dimensional joint posture estimation model is used for the skeleton estimation. The two dimensional joint posture estimation model is a machine learning model that estimates the position of each joint constituting a human body. According to the two dimensional joint posture estimation model, one two dimensional joint posture of the user 1 is obtained from one image in which the user 1 is captured. When a plurality of images of the user 1 are obtained by a plurality of cameras, a plurality of two dimensional joint postures of the user 1 viewed from different directions are obtained.

The full-body tracking system 100 estimates a three dimensional joint posture of the user 1 from the two dimensional joint posture as the next process for the skeleton estimation. A three dimensional joint posture estimation model is used for estimation of the three dimensional joint posture. The three dimensional joint posture estimation model is a machine learning model that converts a two dimensional joint posture into a three dimensional joint posture by adding depth information of a human body obtained by machine learning. When a plurality of two dimensional joint postures viewed from different directions are obtained, the three dimensional joint postures are input to the three dimensional joint posture estimation model, and thus a three dimensional joint posture with higher accuracy is obtained. The full-body tracking system 100 projects a three dimensional joint posture 21 of the user 1 obtained by the skeleton estimation onto the position A1 of the user 1 in the three dimensional coordinate system 20.

The full-body tracking system 100 performs tracking on the user 1 using image data obtained from a plurality of cameras. The tracking mentioned here means tracking of position coordinates of the user 1 moving in the tracking space 10, and is distinguished from full-body tracking. The full-body tracking is a process combining the above-described skeleton estimation and tracking based on image data. When the user 1 moves from the position A1 to the position A2, the full-body tracking system 100 estimates the position A2 in the three dimensional coordinate system 20 after the user 1 moves by tracking. At the same time, the full-body tracking system 100 projects the three dimensional joint posture 21 of the user 1 after movement obtained by the skeletal estimation to the position A2 of the user 1 in the three dimensional coordinate system 20.

The full-body tracking system 100 also performs the tracking and skeleton estimation described above for the other users 2 and 3 in the tracking space 10. The full-body tracking system 100 performs authentication of a target user among the users 1, 2, and 3 whose position information and skeleton information are to be reflected in the avatar in the XR space 30, and acquires the position information and the skeleton information of the target user from the result of tracking and skeleton estimation for each user. The skeletal information of the target user means information regarding a three dimensional joint posture.

Here, an authentication process for confirming whether a person captured by a camera in the tracking space 10 is the target user will be described. In the following description, it is assumed that the user 1 in FIG. 2 is the target user.

A first example of the authentication process is authentication based on a result of collation between position information of the mobile terminal 11 obtained by a GPS mounted on the mobile terminal 11 and position information of each person obtained from image data. The position information of the mobile terminal 11 is position information of the user 1 who carries the mobile terminal 11. The full-body tracking system 100 acquires the position information of the mobile terminal 11 by communication with the mobile terminal 11, and acquires the position information of each person captured by the camera from the image data. It is possible to confirm that a person having position information matching the position information of the mobile terminal 11 among persons captured by the camera is the user 1.

A second example of the authentication process is authentication based on the degree of coincidence between the movement trajectory of the mobile terminal 11 obtained by the GPS mounted on the mobile terminal 11 and the movement trajectory of each person acquired by tracking. The movement trajectory of the mobile terminal 11 is a movement trajectory of the user 1 who carries the mobile terminal 11. The full-body tracking system 100 acquires the movement trajectory of the mobile terminal 11 by communicating with the mobile terminal 11, and acquires the movement trajectory of each person captured by the camera from the tracking result. It is possible to confirm that the person having the movement trajectory having the highest degree of coincidence with the movement trajectory of the mobile terminal 11 among the persons captured by the camera is the user 1.

A third example of the authentication process is face authentication using image data. For example, when the tracking space 10 is a closed space and has an entrance, the face of the user 1 may be captured at the entrance, and the face image acquired at the entrance may be compared with the face image of the person included in the image of the camera. Thus, the account information of the user 1 can be associated with the position information and the skeleton information obtained from the image data of the camera. When the user 1 moves between the cameras, the position information and the skeleton information can be taken over between the cameras by performing the collation of the face images again.

The full-body tracking system 100 transmits avatar generation information including the position information and the skeleton information of the target user to the various devices 11, 12, 13, and 16. The devices 11, 12, 13, and 16 reflect the position information and the skeleton information on the avatar in the XR space 30 using the XR application.

Figure 3:
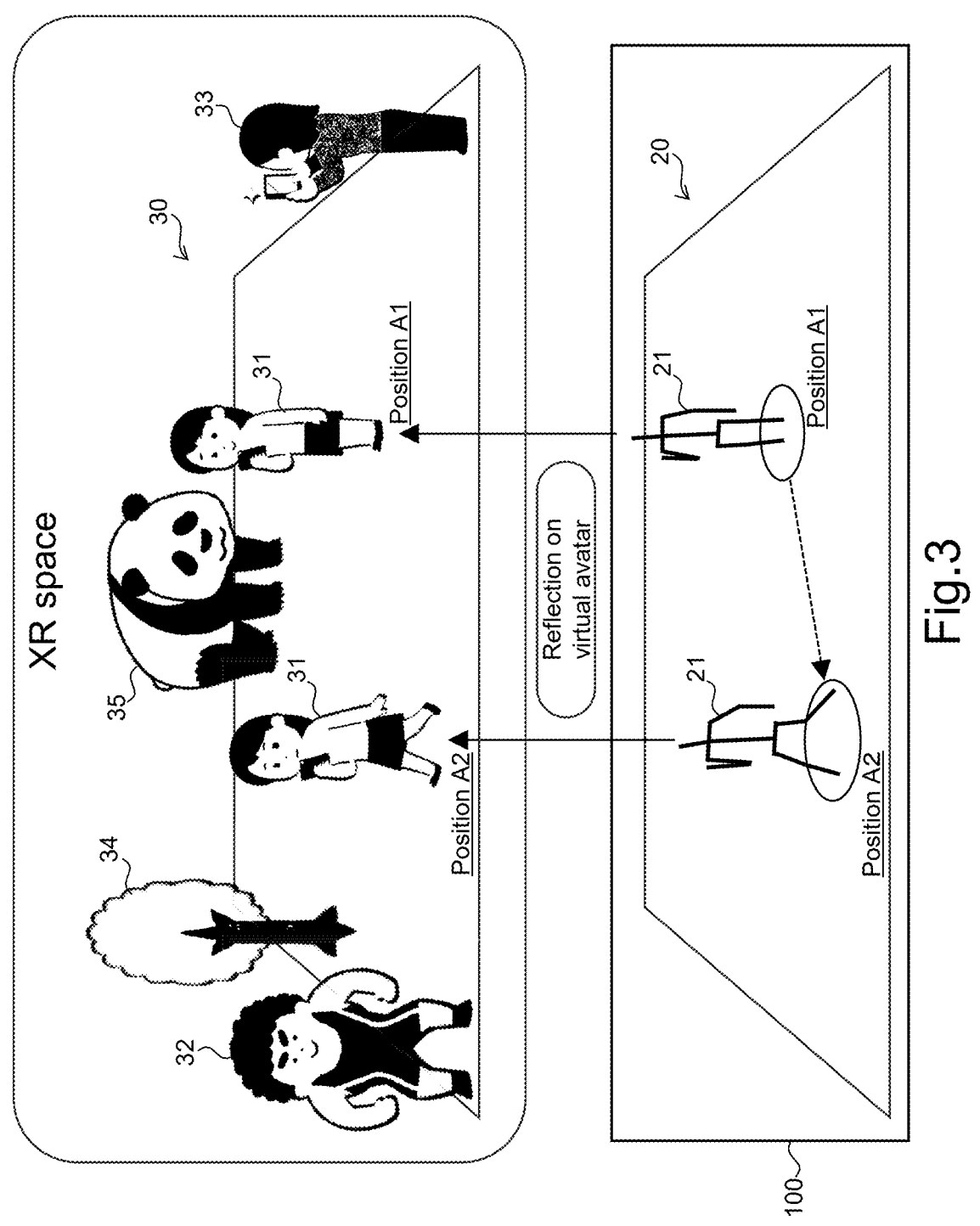
FIG. 3 is a diagram illustrating a mechanism of the full-body tracking according to the embodiment of the present disclosure.

In the example shown in FIG. 3, the position information and the skeleton information of the user 1 are reflected in the avatar 31. Therefore, when the user 1 moves from the position A1 to the position A2 in the tracking space 10, the avatar 31 also moves from the position A1 to the position A2 in the XR space 30. When the user 1 changes his/her posture, the posture of the avatar 31 also changes accordingly. Similarly, the position information and the skeleton information of the user 2 are reflected in the avatar 32, and the position information and the skeleton information of the user 3 are reflected in the avatar 33. In the XR space 30, a stationary object such as the utility pole 4 may be replaced with a plant 34 or an inanimate stationary object having another form, and a moving object such as the vehicle 5 may be replaced with an animal 35 or an inanimate moving object having another form.

3. Configuration of Full-Body Tracking System

Figure 4:
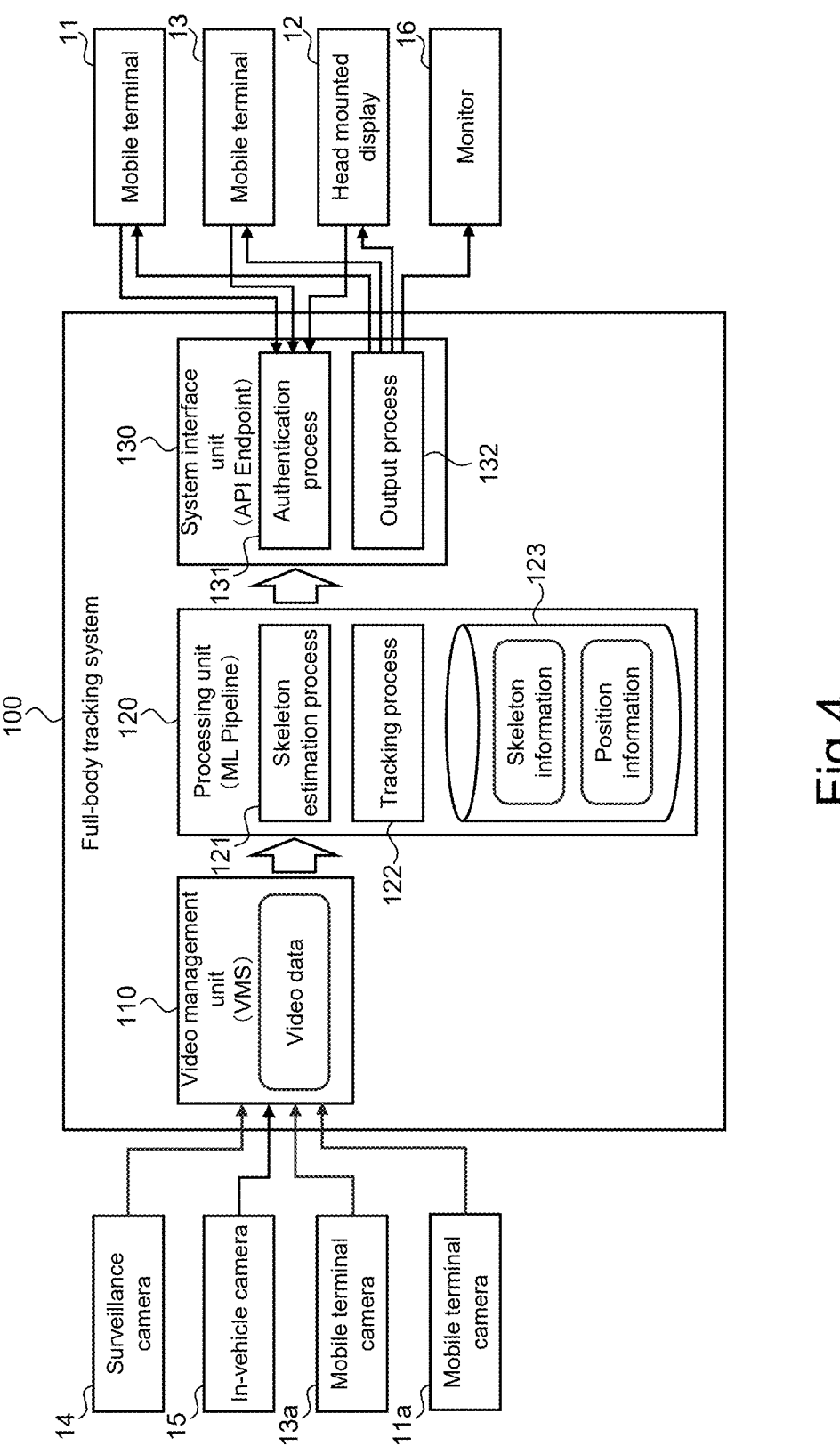
FIG. 4 is a block diagram illustrating a configuration of a full-body tracking system according to the embodiment of the present disclosure.

Next, a configuration of the full-body tracking system 100 that enables the above-described processing for reflecting the position and posture of the user grasped by the plurality of cameras on the avatar will be described with reference to FIG. 4.

The full-body tracking system 100 includes a video management unit 110, a processing unit 120, and a system interface unit 130. These units 110, 120, and 130 may be implemented by separate hardware or may be implemented by software that operates on common hardware.

A specific example of the video management unit 110 is video management software. The video management unit 110 communicates with the cameras 11a, 13a, 14, and 15 located in the tracking space 10 in real time, and acquires images from the cameras 11a, 13a, 14, and 15. The video management unit 110 inputs the acquired video data to the processing unit 120.

An example of the processing unit 120 is a machine learning pipeline. The processing unit 120 executes a skeleton estimation process 121 and a tracking process 122 based on the video data input from the video management unit 110. The skeleton information obtained by the skeleton estimation process 121 and the position information obtained by the tracking process 122 are temporarily stored in a memory 123.

An example of the system interface unit 130 is an API endpoint. The system interface unit 130 acquires, for example, position information or a movement trajectory from the mobile terminals 11 and 13 and the head mounted display 12 located in the tracking space 10, and performs an authentication process 131 of each user based on the position information or the movement trajectory. The system interface unit 130 performs an output process 132 for transmitting the position information and the skeleton information of the avatar to the mobile terminals 11 and 13 and the head mounted display 12 located in the tracking space 10. When the XR space 30 is displayed on the monitor 16, the positional information and skeletal information of the avatar are also transmitted to the monitor 16.

4. Effect

As described above, according to the full-body tracking system 100 of the present embodiment, as long as a camera capable of communication exists in a space, the space can be set as a tracking space. Thus, the tracking space can be expanded without the need for additional devices. Further, according to the full-body tracking system 100, since the image data acquired from the camera located in the tracking space is used, the user does not need to prepare a device for full-body tracking. The user can use an application using full-body tracking on a smartphone, a head mounted display, or the like that does not have a function of full-body tracking. Further, according to the full-body tracking system 100, the user can be authenticated without requiring an additional device for full-body tracking, and the user can perform full-body tracking only by entering the tracking space.

What is claimed is:

1. A full-body tracking system comprising:
processing circuitry configured to:
    communicate with a plurality of cameras located in a tracking space,
    acquire image data captured by the plurality of cameras,
    perform tracking and skeleton estimation for each of one or more users in the tracking space using the image data,
    authenticate a target user among the one or more users,
    acquire position information and skeleton information of the target user from results of the tracking and the skeleton estimation, and reflect a body motion of the target user on a virtual avatar in an XR space using the position information and the skeleton information.

2. The full-body tracking system according to claim 1, wherein the plurality of cameras include a surveillance camera installed in the tracking space.

3. The full body tracking system according to claim 1, wherein the plurality of cameras include a camera mounted on a moving object that moves in the tracking space.

4. The full body tracking system according to claim 1, wherein the plurality of cameras include a camera mounted on a mobile terminal carried by the one or more users.

5. The full-body tracking system according to claim 1, wherein the processing circuitry is configured to authenticate the target user based on face authentication using the image data by comparing a face image of the target user captured at an entrance of the tracking space with a face image of a person included in the image data.

6. The full-body tracking system according to claim 1, wherein the processing circuitry is configured to transmit avatar generation information including the position information and the skeleton information of the target user to a device located in the tracking space for reflecting the position information and the skeleton information on the virtual avatar in the XR space.

7. The full-body tracking system according to claim 1, wherein the skeleton estimation includes estimating a two dimensional joint posture of the target user from the image data using a two dimensional joint posture estimation model, and estimating a three dimensional joint posture of the target user from the two dimensional joint posture using a three dimensional joint posture estimation model.

8. The full-body tracking system according to claim 1, wherein the plurality of cameras include cameras that have been introduced into the tracking space for purposes other than full-body tracking.

9. The full-body tracking system according to claim 1, wherein the processing circuitry is configured to communicate with the plurality of cameras in real time, and wherein the plurality of cameras include at least two of: a surveillance camera installed in the tracking space, an in-vehicle camera mounted on a vehicle moving in the tracking space, and a mobile terminal camera of a mobile terminal carried by one of the one or more users.

10. A full-body tracking system comprising:
processing circuitry configured to:
    communicate with a plurality of cameras located in a tracking space,
    acquire image data captured by the plurality of cameras, perform tracking and skeleton estimation for each of one or more users in the tracking space using the image data,
    authenticate a target user among the one or more users, acquire position information and skeleton information of the target user from results of the tracking and the skeleton estimation, and
    reflect a body motion of the target user on a virtual avatar in an XR space using the position information and the skeleton information, wherein the processing circuitry is configured to authenticate the target user based on a result of comparison between a position of the target user acquired through communication with a mobile terminal carried by the target user and a position of each of the one or more users acquired based on the image data, or based on a degree of coincidence between a movement trajectory of the target user acquired through communication with a mobile terminal carried by the target user and a movement trajectory of each of the one or more users acquired by the tracking.

* * * * *